(12) United States Patent
Maru et al.

(10) Patent No.: US 9,166,485 B2
(45) Date of Patent: Oct. 20, 2015

(54) QUANTIZATION ERROR REDUCTION IN CONSTANT OUTPUT CURRENT CONTROL DRIVERS

(71) Applicant: Cirrus Logic, Inc., Austin, TX (US)

(72) Inventors: Siddharth Maru, Austin, TX (US); Zhaohui He, Austin, TX (US)

(*) Notice: Subject to any disclaimer, the term of this patent is extended or adjusted under 35 U.S.C. 154(b) by 0 days.

(21) Appl. No.: 14/203,792

(22) Filed: Mar. 11, 2014

(65) Prior Publication Data

US 2014/0252990 A1 Sep. 11, 2014

Related U.S. Application Data

(60) Provisional application No. 61/776,082, filed on Mar. 11, 2013.

(51) Int. Cl.
*H05B 37/02* (2006.01)
*H02M 3/335* (2006.01)
(Continued)

(52) U.S. Cl.
CPC ........ *H02M 3/33507* (2013.01); *H02M 1/4258* (2013.01); *H02M 3/156* (2013.01); *H05B 33/0815* (2013.01); *H05B 33/0848* (2013.01); *Y02B 70/126* (2013.01)

(58) Field of Classification Search
USPC ............. 315/209 R, 224, 225, 247, 283, 287, 315/291, 307, 308, 360
See application file for complete search history.

(56) References Cited

U.S. PATENT DOCUMENTS 6,229,292 B1 5/2001 Redl et al.
6,621,256 B2 9/2003 Muratov et al.
(Continued)

FOREIGN PATENT DOCUMENTS

EP 0636889 1/1995
EP 1289107 A3 5/2003
(Continued)

OTHER PUBLICATIONS

Brkovic, Milivoje, Automatic Current Shaper with Fast Output Regulation and Soft-Switching, Telecommunications Energy Conference, Intelec '93. 15th International, Sep. 27-30, 1993, pp. 379-386, vol. 1, California Institute Technology, Pasadena, California USA.
(Continued)

*Primary Examiner* — Tung X Le
(74) *Attorney, Agent, or Firm* — Terrile, Cannatti, Chambers & Holland, LLP; Kent B. Chambers

(57) ABSTRACT

An electronic system and method includes a controller to control a switching power converter in at least two different modes of operation, a normal mode and an error reduction mode. The controller controls an amount of charge pushed (i.e. delivered) by the switching power converter to a load to reduce a charge quantization error. The charge quantization error represents an amount of charge pushed to the load beyond a target charge amount. The controller determines an amount of charge to be pushed to the load. Based on the amount of charge to be pushed to the load, the controller generates a current control signal that controls a current control switch in the switching power converter. Determination of the control signal depends on whether the controller is operating in normal mode or error reduction mode. The controller attempts to reduce the charge quantization error to avoid power fluctuations.

20 Claims, 9 Drawing Sheets

(51) Int. Cl.
*H05B 33/08* (2006.01)
*H02M 1/42* (2007.01)
*H02M 3/156* (2006.01)

(56) References Cited

U.S. PATENT DOCUMENTS

| | | | |
|---|---|---|---|
| 6,724,174 B1 | 4/2004 | Esteves et al. | |
| 6,734,639 B2 | 5/2004 | Chang et al. | |
| 6,940,733 B2 | 9/2005 | Schie et al. | |
| 7,099,163 B1 | 8/2006 | Ying | |
| 7,102,902 B1 | 9/2006 | Brown et al. | |
| 7,145,295 B1 | 12/2006 | Lee et al. | |
| 7,276,861 B1 | 10/2007 | Shteynberg et al. | |
| 7,310,244 B2 | 12/2007 | Yang et al. | |
| 7,388,764 B2 | 6/2008 | Huynh et al. | |
| 7,505,287 B1* | 3/2009 | Kesterson | 363/21.01 |
| 7,642,762 B2 | 1/2010 | Xie et al. | |
| 7,710,047 B2 | 5/2010 | Shteynberg et al. | |
| 7,719,248 B1 | 5/2010 | Melanson | |
| 7,759,881 B1 | 7/2010 | Melanson | |
| 7,786,711 B2 | 8/2010 | Wei et al. | |
| 7,804,256 B2 | 9/2010 | Melanson | |
| 7,852,017 B1 | 12/2010 | Melanson | |
| 7,880,400 B2 | 2/2011 | Zhou et al. | |
| 8,115,465 B2* | 2/2012 | Park et al. | 323/284 |
| 8,222,832 B2 | 7/2012 | Zheng et al. | |
| 8,581,504 B2* | 11/2013 | Kost et al. | 315/209 R |
| 8,593,075 B1* | 11/2013 | Melanson et al. | 315/291 |
| 8,947,017 B2 | 2/2015 | Kikuchi et al. | |
| 2004/0196672 A1 | 10/2004 | Amei | |
| 2005/0231183 A1 | 10/2005 | Li et al. | |
| 2006/0022916 A1 | 2/2006 | Aiello | |
| 2006/0214603 A1 | 9/2006 | Oh | |
| 2006/0261754 A1 | 11/2006 | Lee | |
| 2006/0285365 A1 | 12/2006 | Huynh | |
| 2007/0024213 A1 | 2/2007 | Shteynberg | |
| 2007/0170873 A1 | 7/2007 | Mishima | |
| 2007/0182338 A1 | 8/2007 | Shteynberg | |
| 2007/0285031 A1 | 12/2007 | Shteynberg | |
| 2008/0062584 A1 | 3/2008 | Freitag et al. | |
| 2008/0062586 A1 | 3/2008 | Apfel | |
| 2008/0174291 A1 | 7/2008 | Hansson | |
| 2008/0224636 A1 | 9/2008 | Melanson | |
| 2008/0259655 A1 | 10/2008 | Wei | |
| 2009/0059632 A1 | 3/2009 | Li et al. | |
| 2009/0079357 A1 | 3/2009 | Shteynberg et al. | |
| 2009/0108677 A1 | 4/2009 | Walter et al. | |
| 2009/0184665 A1 | 7/2009 | Ferro | |
| 2009/0284182 A1 | 11/2009 | Cencur | |
| 2010/0060200 A1* | 3/2010 | Newman et al. | 315/307 |
| 2010/0066328 A1 | 3/2010 | Shimizu et al. | |
| 2010/0128501 A1 | 5/2010 | Huang et al. | |
| 2010/0141317 A1 | 6/2010 | Szajnowski | |
| 2010/0148681 A1 | 6/2010 | Kuo et al. | |
| 2010/0156319 A1 | 6/2010 | Melanson | |
| 2010/0213857 A1 | 8/2010 | Fan | |
| 2010/0213859 A1 | 8/2010 | Shteynberg | |
| 2010/0238689 A1 | 9/2010 | Fei et al. | |
| 2010/0244726 A1 | 9/2010 | Melanson | |
| 2011/0199793 A1 | 8/2011 | Kuang et al. | |
| 2011/0276938 A1 | 11/2011 | Perry et al. | |
| 2012/0025736 A1 | 2/2012 | Singh et al. | |
| 2012/0153858 A1 | 6/2012 | Melanson et al. | |
| 2012/0248998 A1 | 10/2012 | Yoshinaga | |
| 2012/0306406 A1 | 12/2012 | Grisamore et al. | |
| 2012/0306407 A1 | 12/2012 | He et al. | |
| 2012/0327690 A1 | 12/2012 | Melanson | |
| 2013/0300309 A1 | 11/2013 | Melanson | |

FOREIGN PATENT DOCUMENTS

| | | |
|---|---|---|
| WO | 2004051834 A1 | 6/2004 |
| WO | 2007016373 A2 | 2/2007 |
| WO | 2008004008 A3 | 1/2008 |
| WO | 2010065598 A2 | 10/2010 |

OTHER PUBLICATIONS

Dilouie, Craig, Introducing the LED Driver, Electrical Construction & Maintenance (EC&M), Sep. 1, 2004, pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

International Search Report, PCT/US2014/023399, European Patent Office, Feb. 19, 2015, pp. 1-4.

Written Opinion, PCT/US2014/023399, European Patent Office, Feb. 19, 2015, pp. 1-6.

* cited by examiner

QUANTIZATION ERROR REDUCTION IN CONSTANT OUTPUT CURRENT CONTROL DRIVERS

CROSS-REFERENCE TO RELATED APPLICATION

This application claims the benefit under 35 U.S.C. §119(e) and 37 C.F.R. §1.78 of U.S. Provisional Application No. 61/776,082, filed Mar. 11, 2013, which is incorporated by reference in its entirety.

BACKGROUND OF THE INVENTION

1. Field of the invention

The present invention relates in general to the field of electronics, and more specifically to quantization error reduction in constant output current control drivers.

2. Description of the Related Art

Many electronic systems utilize switching power converters to efficiently convert power from one source into power useable by a device (referred to herein as a "load"). Some facilities, such as homes and buildings, include light source dimming circuits (referred to herein as a "dimmer"). Dimmers control the power delivered to a load, such as a lamp having one or more light sources. Dimming saves energy and, in a lighting installation, also allows a user to adjust the intensity of the light source to a desired level.

A switching power converter is controlled by a controller. For systems that are not intended for use with dimmers, the controller provides power factor correction for displacement and distortion so that the phases of an alternating current (AC) supply voltage and an average input current to the switching power converter are approximately in-phase (power factor displacement) and the current shape follows the shape attic supply voltage (power factor distortion). For systems that include dimmers and constant current loads, the controller controls the switching power converter to provide a constant, average input current to the load without regard to power factor correction.

FIG. 1 depicts an electronic system 100 that converts power from voltage supply 102 into power usable by load 104. Load 104 is a constant current load that includes, for example, one or more light emitting diodes (LEDs). A controller 106 controls the power conversion process. Voltage source 102 can be any type of voltage source such as a public utility supplying a 60 Hz/110 V input voltage $V_{IN}$ in North America or a 50 Hz/220 V input voltage $V_{IN}$ in Europe or the People's Republic of China. The dimmer 103 phase cuts the supply voltage $V_{SUPPLY}$, and the full-bridge rectifier 105 rectifies the phase-cut supply voltage to generate a rectified phase-cut input voltage $V_{IN}$ to the flyback-type switching power converter 110. In at least one embodiment, the dimmer 103 is a triac-based dimmer.

The controller 106 provides a pulse width modulated (PWM) control signal $CS_0$ to current control switch 108 in a flyback-type, switching power converter 110 to control the conversion of input voltage $V_{IN}$ into a primary-side voltage $V_P$ and secondary voltage $V_S$. When the switch 108 is non-conductive, i.e. "off", the primary voltage $V_P$ is N times the secondary voltage $V_S$, i.e. $V_P = N \cdot V_S$, and "N" is a ratio of turns in the primary-winding 114 to the turns in the secondary-winding 118. The switch 108 is, for example, a field effect transistor (FET). When control signal $CS_0$ causes switch 108 to conduct, a primary-side current $i_{IN}$ flows into a primary-winding 114 of transformer 116 to energize the primary-winding 114. When switch 108 conducts, the diode 120 is reverse biased, and the secondary-side current $i_S$ is zero. When control signal $CS_0$ opens switch 108, the primary voltage $V_P$ and secondary voltage $V_S$ reverse the indicated polarities, and diode 120 is forward biased. When diode 120 is forward biased, the secondary side current $i_S$ flows through the diode 120 to charge capacitor 122 so that an approximately constant current and direct current (DC) voltage $V_{LD}$ is provided to the load 104.

SUMMARY OF THE INVENTION

In one embodiment of the present invention, a method includes operating the switching power converter in a first mode during multiple charge pushing cycles to push a first amount of charge to a load coupled to the switching power converter during a cycle of an input supply voltage to a switching power converter. The method further includes after one or more of the charge pushing cycles and when a remaining amount of charge to be pushed to the load relative to a target amount of charge to be pushed to the load is less than an amount of charge pushed to the load in an immediately preceding charge pushing cycle, operating the switching power converter in an error reduction mode to push a second amount of charge to the load that reduces an error in an amount of charged pushed to the load relative to the target amount that would occur if only the first mode is used to push charge to the load.

In another embodiment of the present invention, a controller configured to operate a switching power converter in a first mode during multiple charge pushing cycles to push a first amount of charge to a load coupled to the switching power converter during a cycle of an input supply voltage to the switching power converter. The controller is further configured to, after one or more of the charge pushing cycles and when a remaining amount of charge to be pushed to the load relative to a target amount of charge to be pushed to the load is less than an amount of charge pushed to the load in an immediately preceding charge pushing cycle, operate the switching power converter in an error reduction mode to push a second amount of charge to the load that reduces an error in an amount of charged pushed to the load relative to the target amount that would occur if only the first mode is used to push charge to the load.

In a further embodiment of the present invention, an apparatus includes a load, a switching power converter coupled to the load, and a controller coupled to the switching power converter. The controller is configured to operate a switching power converter in a first mode during multiple charge pushing cycles to push a first amount of charge to a load coupled to the switching power converter during a cycle of an input supply voltage to the switching power converter. The controller is further configured to, after one or more of the charge pushing cycles and when a remaining amount of charge to be pushed to the load relative to a target amount of charge to be pushed to the load is less than an amount of charge pushed to the load in an immediately preceding charge pushing cycle, operate the switching power converter in an error reduction mode to push a second amount of charge to the load that reduces an error in an amount of charged pushed to the load relative to the target amount that would occur if only the first mode is used to push charge to the load.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
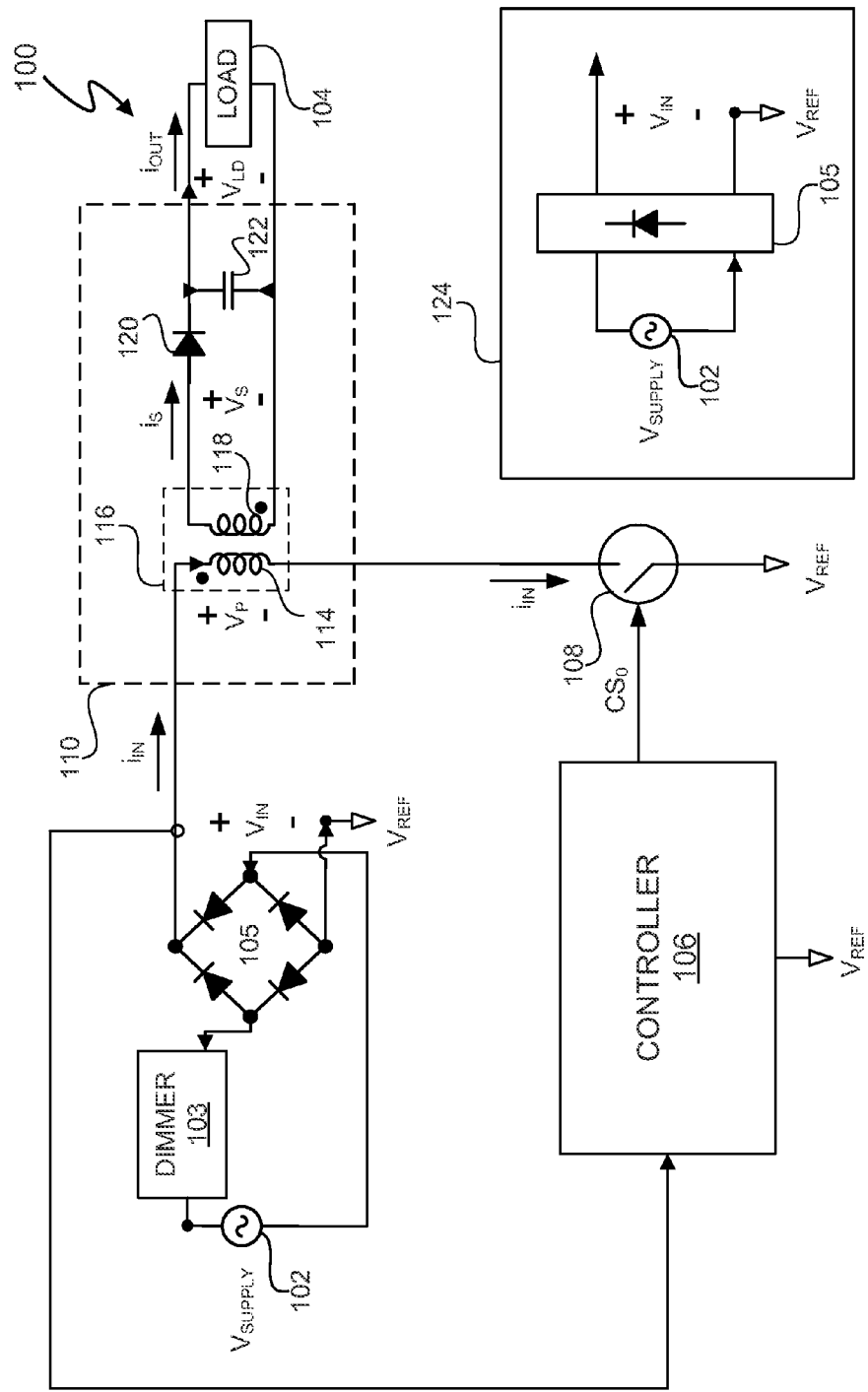
FIG. 1 (labeled prior art) depicts an electronic system that provides either power factor correction or a constant current.

In at least one embodiment, an electronic system and method includes a controller to control a switching power converter in at least two different modes of operation, a normal mode and an error reduction mode. The controller controls an amount of charge pushed (i.e. delivered) by the switching power converter to a load to reduce a charge quantization error. The charge quantization error represents an amount of charge pushed to the load beyond a target charge amount. In at least one embodiment, the controller determines an amount of charge to be pushed to the load. Based on the amount of charge to be pushed to the load, the controller generates a current control signal that controls a current control switch in the switching power converter. Controlling the current control switch allows the controller to control the current in the switching power converter and, thus, the amount of charge pushed to the load. Determination of the control signal depends on whether the controller is operating in normal mode or error reduction mode. In at least one embodiment, the controller attempts to reduce the charge quantization error to avoid power fluctuations during each half time cycle of an unrectified supply voltage (i.e. each cycle of a rectified input supply voltage). For some loads, such as one or more light emitting diodes, even small fluctuations in charge delivered to the load notably manifest as, for example, light flicker.

In at least one embodiment, in normal mode, the controller determines a target amount of charge to be pushed to the load during a period of time, such as during a half line cycle of a input supply voltage. The controller determines a peak current and a switching time of the current control switch (which equates to a pulse width of the current control signal) in normal mode that causes an amount of charge to be pushed to the load for each cycle of the current control signal. The controller determines an amount of charge remaining to be pushed to the load after, for example, each cycle of the current control signal. The controller also determines an amount of charge pushed to the load after the most recent cycle of the current control signal. If the amount of charge remaining to be pushed is greater than or equal to an amount of charge pushed (times a scaling factor in at least one embodiment) in the most previous cycle of the current control signal, the controller remains in normal mode and repeats the determination of the peak current or, in at least one embodiment, utilizes the same peak current calculations, to push charge to the load.

However, when the controller determines that the amount of charge remaining to be pushed is less than the amount of charge pushed (times a scaling factor in at least one embodiment) in the most previous cycle of the current control signal, the controller enters an error reduction mode. In at least one embodiment, the determination of the peak current in normal mode has limited granularity. If the same peak current is again determined using the normal mode, the controller may cause a total amount of charge pushed to the load to exceed the target amount. This excess charge can change from cycle to cycle of the input voltage, and, thus, can result in power fluctuations to the load. In the error reduction mode, the controller increases the granularity of the determination of the peak current and, thus, can determine and control a more finely tuned peak current and, thus, a more finely tuned amount of charge pushed to the load. This improved granularity of the charge delivered to the load minimizes the amount of charge delivered to the load that exceeds the target amount of charge.

In the error reduction mode, the controller alters the process of determining and modulating the peak current for the switching power converter, and, in at least one embodiment, determines the peak current as a function of at least the determined amount of unpushed charge, the amount of charge pushed in the immediately preceding cycle of the current control switch, the previously determined peak current, and a conduction time period of a current in a secondary-winding of a transformer of the switching power converter. By using the error reduction mode, the controller reduces an amount of error in the charge pushed to the load relative to using the normal mode peak current determinations to determine an amount of charge delivered to the load.

Figure 2:
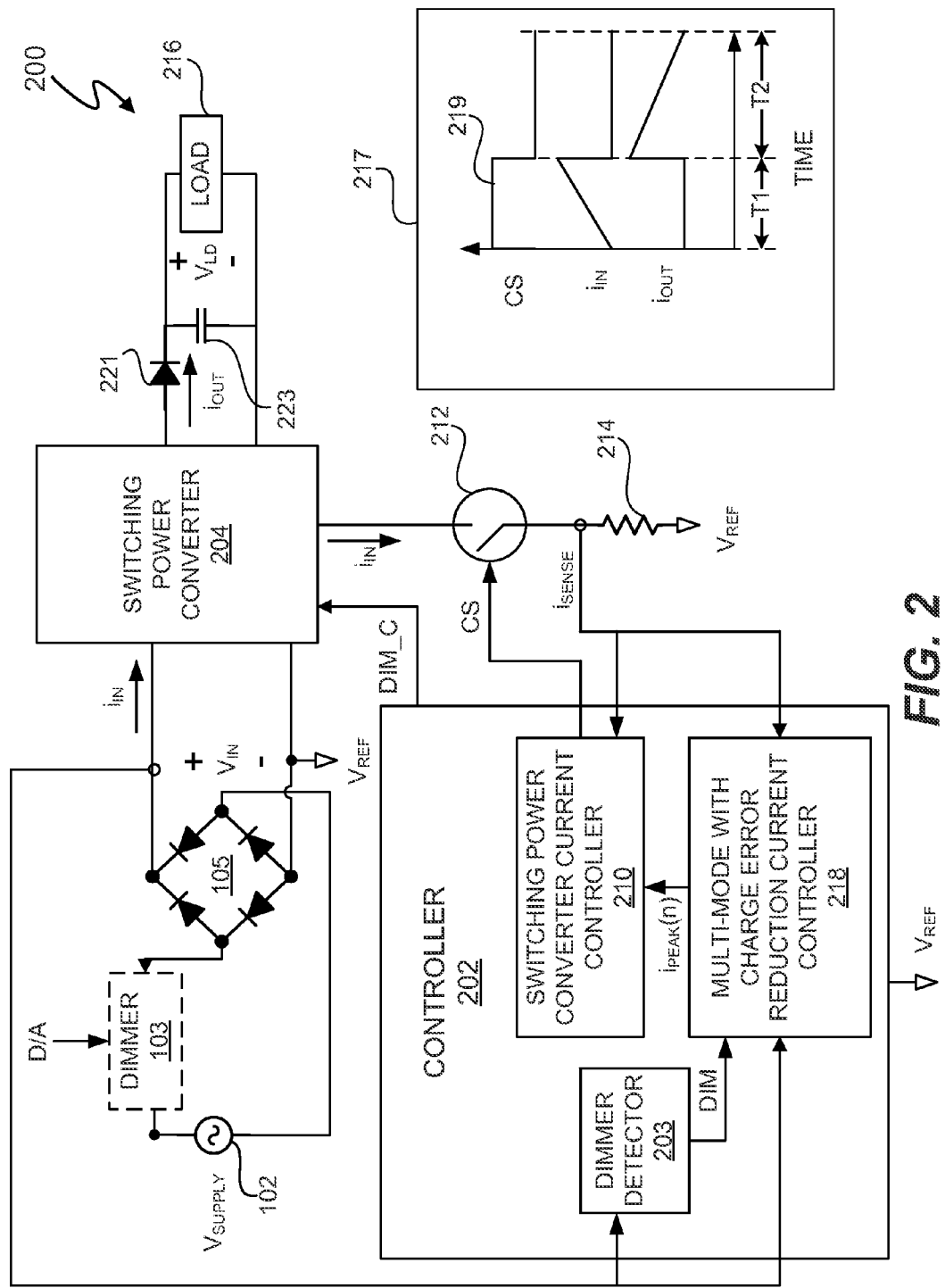
FIG. 2 depicts an electronic system having a controller that operates a switching power converter in any of multiple input current control modes including a quantization error reduction mode.

FIG. 2 depicts an electronic system 200 having a controller 202 that includes multi-mode operations to control an amount of charge pushing to the load 216. In at least one embodiment, the two modes of operations for regulating the charge pushed to the load are normal mode and error reduction mode. The switching power converter 204 can be any type of switching power converter such as a flyback, boost, buck, boost-buck, or Cúk type switching power converter. The electronic system 200 receives power from a voltage supply 102. The voltage supply 102 is an AC supply and, in at least one embodiment, is identical to voltage supply 102 (FIG. 1). The optional dimmer 103 phase cuts the supply voltage $V_{SUPPLY}$, and the full-bridge diode rectifier 108 rectifies the phase-cut supply voltage $V_{SUPPLY}$ to generate the phase-cut input voltage $V_{IN}$. Thus, each cycle of the input voltage $V_{IN}$ represents a half-line cycle of the supply voltage $V_{SUPPLY}$. The dimmer 103 can be any type of dimmer, and, in at least one embodiment, the dimmer 103 is a triac-based dimmer. In other embodiments, the dimmer 103 is an electronic dimmer that uses well-known components such as high power field effect transistors (FETs) to phase-cut the supply voltage $V_{SUPPLY}$. The dimmer 103 can be disabled by asserting the disable signal D/A so that the input voltage $V_{IN}$ is not phase-cut.

The controller 202 includes a switching power converter current controller 210 to generate a control signal CS to control conductivity of current control switch 212. In at least one embodiment, the control signal CS is a pulse modulated signal, and the switch 212 is a FET. When the switch 212 conducts, the input current $i_{IN}$ flows through the switching power converter 204, the switch 212, and the sense resistor 214. Controlling the input current controls the output current $i_{OUT}$ of the switching power converter 204. Although the switch 212 is shown outside the switching power converter 204 for clarity, in at least one embodiment, the switch 212 is considered to be part of the switching power converter 204.

Exemplary waveforms 217 depict a period of the control signal CS and corresponding input and output $i_{OUT}$ currents. The input current $i_{IN}$ ramps up with each pulse 219 of the control signal CS and ceases at the end of the pulse 219. When the pulse 219 of control signal CS ends, the output current $i_{OUT}$ flows through diode 221 and charges capacitor 223 to the load voltage $V_{LD}$, which provides power to the load 216. The load 216 can be any type of load, including one or more lighting devices such as one or more light emitting diodes. In at least one embodiment, the controller 202 includes a dimmer detector 203 to detect whether the dimmer 103 is substantially phase cutting the input voltage $V_{IN}$ to the switching power converter 204 and to provide a DIM signal indicating a dimming level of the dimmer 103. U.S. Pat. No. 7,667,408, entitled "Lighting System with Lighting Dimmer Output Mapping", inventors John L. Melanson and John Paulos, and assignee Cirrus Logic, Inc. ("Melanson II") describes exemplary embodiments of detecting a dimmer level represented by the DIM signal. The controller 202 generates the dimmer compatibility control signal DIM_C. U.S. patent application Ser. No. 12/858,164, entitled "Dimmer Output Emulation" and filed Aug. 17, 2010 and U.S. patent application Ser. No. 13/290,032, entitled "Switching Power Converter Input Voltage Approximate Zero Crossing Determination" and filed Nov. 4, 2011 describe exemplary embodiments of dimmer output compatibility systems and methods and are both incorporated by reference in their entireties. In at least one embodiment, the electronic system 200, except for the voltage supply 102 and the dimmer 103, are included in a lamp, and the load 216 includes one or more light emitting diodes. Although the DIM signal can represent a brightness level for a light source. In at least one embodiment, the DIM signal represents a generic fraction of power to be provided to load 216, regardless of whether the load 216 includes a light source, such as one or more light emitting diodes, or not.

Figure 3:
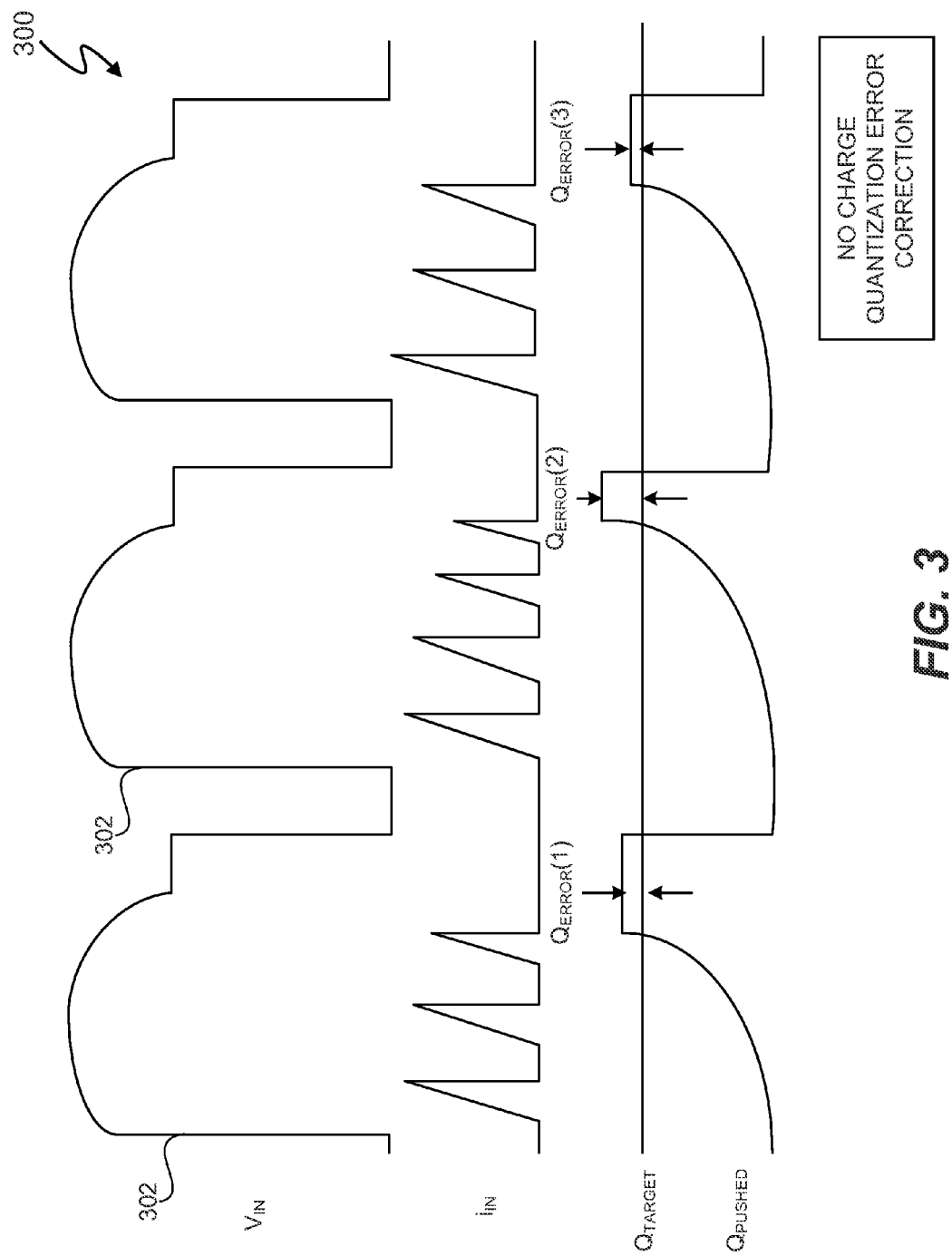
FIG. 3 depicts exemplary signal and charge integration waveforms that do not include any charge error reduction.

FIG. 3 depicts exemplary signal and charge integration waveforms 300 that do not include any charge error reduction. Referring to FIGS. 2 and 3, the input voltage $V_{IN}$ is phase-cut by the dimmer 103, and the switching power converter current controller 210 generates the current control signal CS beginning at the leading edges 302. During each cycle of the control signal CS, charge Q is pushed to the load 216. As subsequently described in more detail, for a given dimmer level DIM the controller 202 determines the maximum value (i.e. the "peak") of the input current $i_{IN}$ to set the amount of charge Q that is pushed to the load 216 during each cycle of the control signal CS. $Q_{PUSHED}$ depicts an integration of the charge pushed to the load 216. Each leading edge of a pulse, such as pulse 219, of the current control signal CS causes the input current $i_{IN}$ to rise. The pulse of the control signal CS continues for time period T1. Once the input current $i_{IN}$ reaches a predetermined peak value, the switching power converter current controller 210 ends the pulse of the control signal CS, the input current $i_{IN}$ abruptly falls, and the output current $i_{OUT}$ rises. The output current $i_{OUT}$ decays while charging load capacitor 223 during time period T2. The total period of control signal CS is TT (not shown) which may coincide with the end of period T2 when the controller 202 operates in continuous or critical conduction mode or may extend beyond the end of period T2 when the controller 202 operates in discontinuous conduction mode.

When the dimmer 103 phase cuts the supply voltage $V_{SUPPLY}$, the controller 202 attempts to push a constant amount of charge to the load 216 for a given dimmer level as, for example, described in U.S. patent application Ser. No. 13/715,914 filed on Dec. 14, 2012 entitled "Multi-mode Flyback Control for a Switching Power Converter" to Maru et. al. (the "Maru Application", which is hereby incorporated by reference. As described in the Maru reference, in the dimmer mode, the controller 205 controls the flyback converter 208 so that the same amount of charge is provided to the LED load 207 during each half line cycle of the supply voltage $V_{SUPPLY}$. In at least one embodiment, in accordance with the Maru Application, the controller 202 ensures that the output current $i_{OUT}$ to the load 216 is regulated as an approximately constant value irrespective of the instantaneous input current $i_{IN}$.

At very small phase-cuts of the input voltage $V_{IN}$, the DIM value is small, which in-turn means that a target charge $Q_{TARGET}$ value to be delivered to the load 216 is also small. Due to this small value, the switching power converter current controller 210 cycles the switch 212 only a few times (typically 10 or fewer) before an amount of charge ($Q_{PUSHED}$) pushed to the load 216 exceeds the target charge $Q_{TARGET}$. Relative to the indicated target charge $Q_{TARGET}$, the integrated charge pushed $Q_{PUSHED}$ to the load 216 result in excess charge being pushed to the load 216 as indicated by the exemplary charge quantization errors $Q_{ERROR}(1)$, $Q_{ERROR}(2)$, and $Q_{ERROR}(3)$. Causes of the charge quantization errors include, but are not limited to, minor variations in (i) the supply voltage $V_{SUPPLY}$, (ii) the firing voltage of the dimmer 103, and/or (iii) the value of the DIM signal, and the charge quantization errors may cause the switch 212 of switching power converter 204 to switch a different number of times in each half line cycle of the supply voltage $V_{SUPPLY}$ before charge $Q_{PUSHED}$ exceeds charge $Q_{TARGET}$. This switching process can lead to the integrated amount of charge $Q_{PUSHED}$ exceeding the target charge $Q_{TARGET}$ by different amounts in each half line cycle. In at least one embodiment, the differences are particularly noticeable at low phase cuts of the supply voltage $V_{SUPPLY}$, since at low phase-cuts the number of cycles of the control signal CS are very small, and even a small variation in the number of cycles can cause the error between the integrated charge $Q_{PUSHED}$ and the target charge $Q_{TARGET}$ to vary significantly from half line cycle to half line cycle of the supply voltage $V_{SUPPLY}$.

To reduce the charge quantization errors, the controller 202 includes a multi-mode with charge error reduction current controller 218. In at least one embodiment, the controller 218 allows the system 200 to operate in at least a normal current control mode and an error reduction current control mode.

Figure 4:
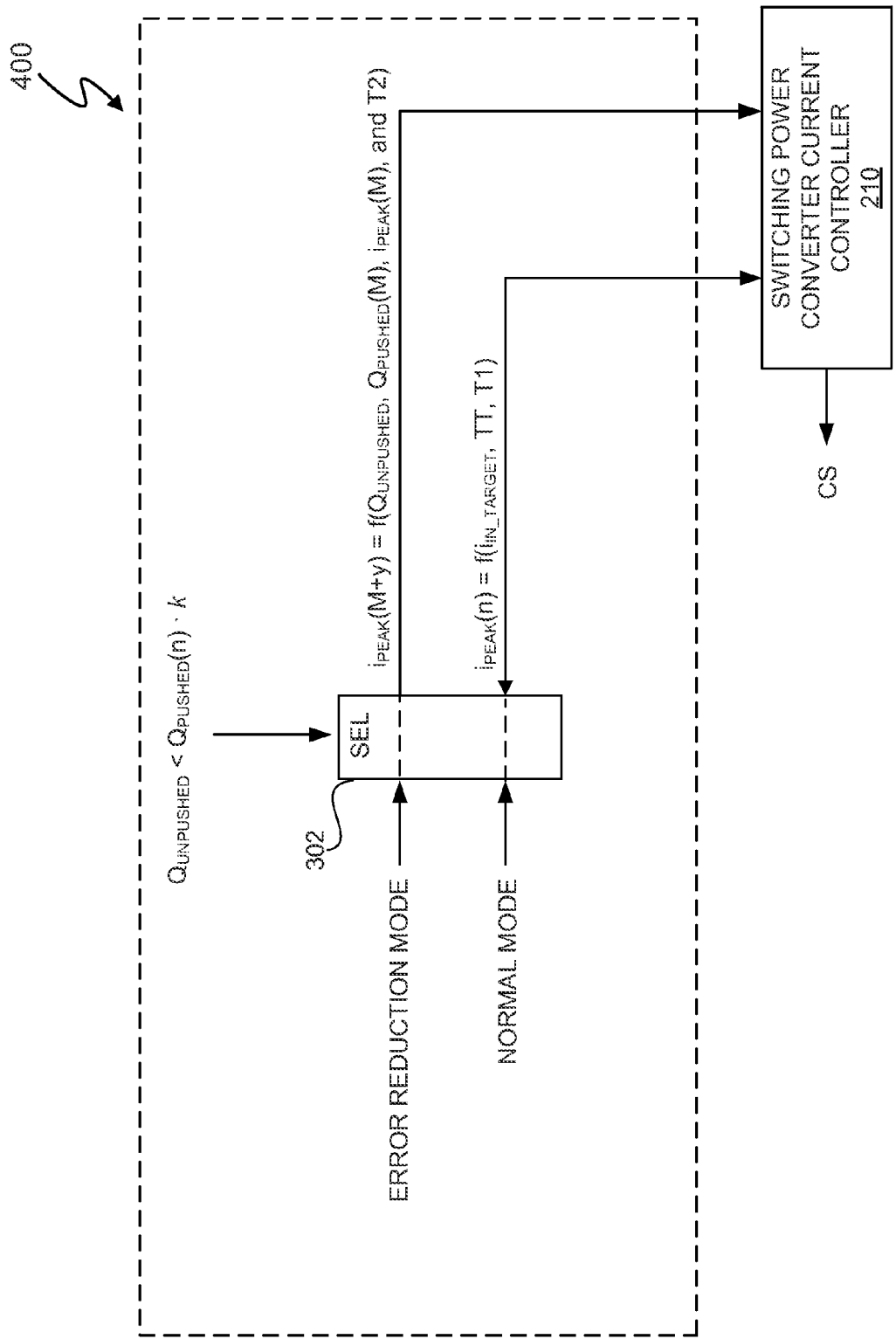
FIG. 4 depicts a normal mode and error reduction mode functional component for the multi-mode with charge error reduction current controller.

FIG. 4 depicts a normal mode and error reduction mode functional component 400 for the multi-mode with charge error reduction current controller 218. As subsequently explained in more detail, whether to operate in normal mode or error reduction mode depends on whether the amount of unpushed charge $Q_{UNPUSHED}$ that has not been pushed to the load 216 is less than the amount of charge pushed to the load in the current $M^{th}$ cycle of the control signal CS, where M is an integer index representing the current cycle of the control signal CS times an optional scaling factor k. In at least one embodiment, the scaling factor k is a value between 0 and 1. In at least one embodiment, smaller values of k provide higher sensitivity to an impending charge quantization error and can, thus, cause the controller 218 to enter the error reduction mode earlier than with higher values of k or no scaling factor.

If $Q_{UNPUSHED} \leq Q_{PUSHED}(n) \cdot k$, the controller 218 selects normal mode operation and, as subsequently described in more detail, determines peak currents $i_{PEAK}(n)$ for the first M cycles of control signal cycles CS as a function of a target input current $i_{IN}$, the duty cycle TT of the control signal CS, and the pulse width of the control signal CS. "n" is an integer index. If $Q_{UNPUSHED}<Q_{PUSHED}(n) \cdot k$, the controller 218 selects error reduction mode operation and, as subsequently described in more detail, determines peak currents $i_{PEAK}(M+y)$ for the first the next y cycles of control signal cycles CS as a function of the unpushed charge $Q_{UNPUSHED}$, the pushed charge $Q_{PUSHED}(M)$ for the $M^{th}$ cycle of the control signal CS, a target input current $i_{IN\_TARGET}$, the current peak current $i_{PEAK}(M)$, and the output current $i_{OUT}$ duration T2. "y" is an integer index. The controller 218 provides the value of $i_{PEAK}(n)$ to the switching power converter current controller 210, and the switching power converter current controller 210 generates a pulse of the control signal CS until the $i_{SENSE}$ signal indicates that the value of the input current has reached the peak value $i_{PEAK}(n)$. "n" is an integer index and represents present value of the peak current as determined by the controller 218.

Figure 5:
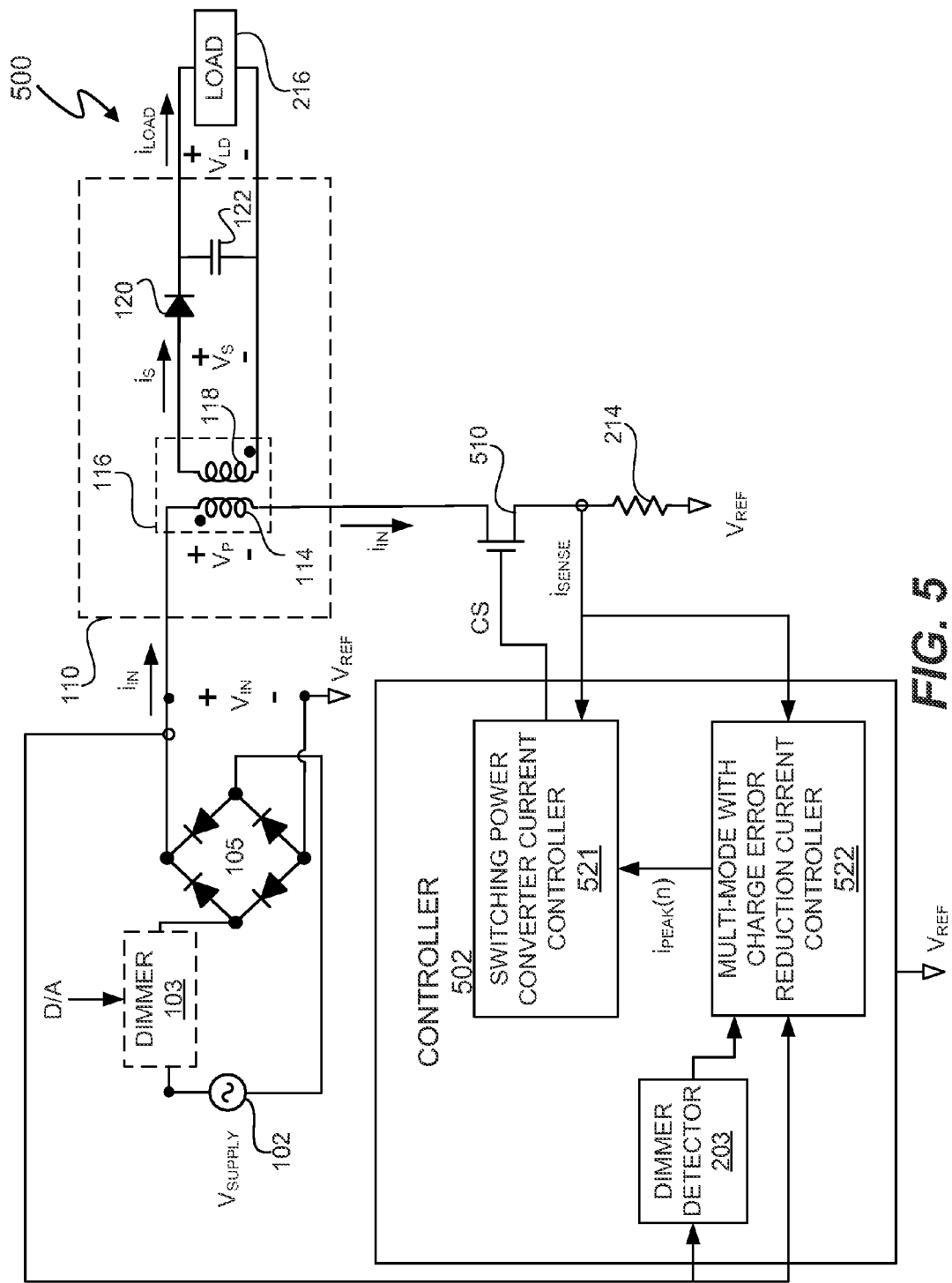
FIG. 5 depicts an electronic system, which represents one embodiment of the electronic system of FIG. 2.

FIG. 5 depicts an electronic system 500, which represents one embodiment of the electronic system 200. The switching power converter current controller 521 represents one embodiment of the controller 210, and the multi-mode with charge error reduction current controller 522 represents one embodiment of the controller 218. The electronic system 500 utilizes a flyback-type switching power converter 110, which converts the input voltage $V_{IN}$ and input current $i_{IN}$ into a secondary-side current $i_S$. Secondary-side current $i_S$ represents one embodiment of the output current $i_{OUT}$ in FIG. 2. The switching power converter 110 represents one embodiment of the switching power converter 204. Switch 510 is a field effect transistor (FET) and represents one embodiment of the switch 212.

Figure 6:
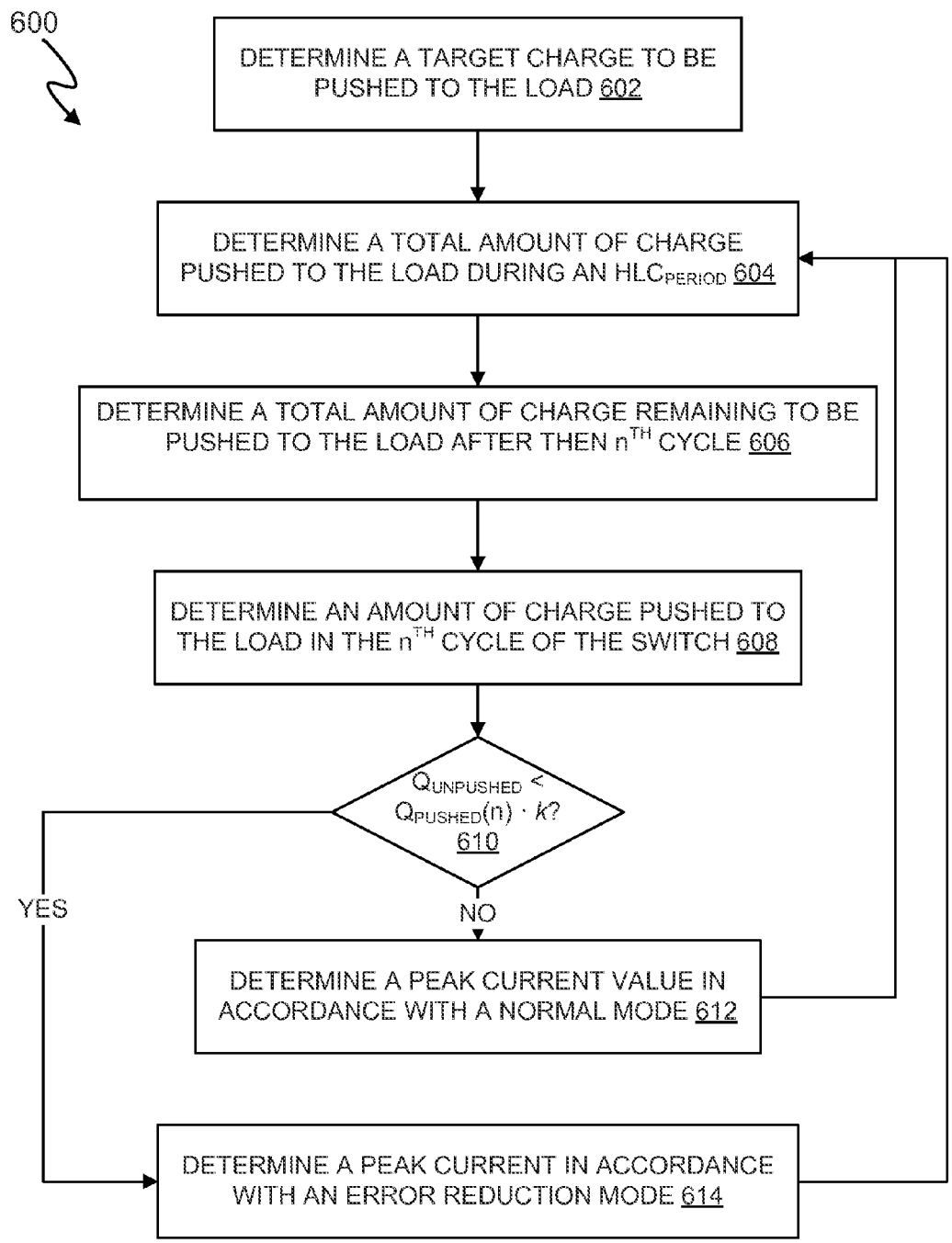
FIG. 6 depicts an exemplary normal mode and error reduction mode process used by at least one embodiment of a multi-mode with charge error reduction current controller of the electronic system of FIG. 5.

FIG. 6 depicts an exemplary normal mode and error reduction mode process 600 used by at least one embodiment of the multi-mode with charge error reduction current controller 522 to determine the value of the peak current $i_{PEAK}(n)$ for switching power converter current controller 110. Each cycle of the current control switch 212 of the switching power converter 204 represents a charge pushing cycle that results in charge pushed to the load 216. In operation 602, the controller 522 determines a target charge $Q_{TARGET}$ to be pushed to the load 216 in accordance with Equation 1:

$$Q_{TARGET}=i_{OUT} \cdot \text{Dim} \cdot HLC_{PERIOD};\qquad \text{Equation 1}$$

wherein:
$Q_{TARGET}$ is the target charge to be pushed to the load,
$i_{OUT}$ is a target current to be pushed to the load,
Dim is a dim level that indicates a fraction of power to be provided to the load 216, and
$HLC_{PERIOD}$ is a half line cycle of the AC input supply voltage provided to the switching power converter;

In operation 604, the controller 522 determines a total amount of charge pushed to the load during the $HLC_{PERIOD}$ in accordance with Equation 2:

$$Q_{PUSHED} = \sum_{n=1}^{M}\left(\frac{N}{2} \cdot i_{PEAK}(n) \cdot T2\right);\qquad \text{Equation 2}$$

wherein:
$Q_{PUSHED}$ is the total amount of charge pushed,
M is an integer representing a total number cycles of the current control switch 510 during the $HLC_{PERIOD}$ occurring during the normal mode of operation,
N is a number representing a turns ratio of primary-side to secondary-side windings of the transformer,
$i_{PEAK}(n)$ is a peak current in the primary-side winding for the $N^{th}$ cycle of the current control switch, and "n" is an integer index, and
T2 is a conduction time period of a current in the secondary-side winding;

In operation 606, the controller 522 determines a total amount of charge remaining to be pushed to the load after the $n^{th}$ cycle in accordance with Equation 3:

$$Q_{UNPUSHED}=Q_{TARGET}-Q_{PUSHED};\qquad \text{Equation 3}$$

wherein $Q_{UNPUSHED}$ is the total amount of charge remaining to be pushed to the load after the $n^{th}$ cycle;

In operation 608, the controller 522 determines an amount of charge pushed to the load in the $n^{th}$ cycle of the switch in accordance with Equation 4:

$$Q_{PUSHED}(n) = \frac{N}{2} \cdot i_{PEAK}(n) \cdot T2;\qquad \text{Equation 4}$$

wherein:
$Q_{PUSHED}(n)$ is the amount of charge pushed to the load in the $n^{th}$ cycle of the current control switch; and
$i_{PEAK}(n)$ is the peak current value for the $n^{th}$ cycle of the current control switch;

in operation 610, the controller 522 determines if the total amount of charge remaining to be pushed to the load after the $n^{th}$ cycle is less than the amount of charge pushed to the load in the $n^{th}$ cycle of the switch 512 times a scaling factor in accordance with Equation 5:

$$Q_{UNPUSHED}<Q_{PUSHED}(n) \cdot k;\qquad \text{Equation 5}$$

where k is a scaling factor between 0 and 1.

If $Q_{UNPUSHED} \geq Q_{PUSHED}(n) \cdot k$, then to operate the switching power converter 110 in normal mode during multiple charge pushing cycles of the control signal CS and switch 510 to push charge to the load 216, in operation 612 the controller 522 determines a peak current value in accordance with Equation 6:

$$i_{PEAK}(n) = 2 \cdot i_{IN\_TARGET} \cdot \frac{TT}{T1};\qquad \text{Equation 6}$$

wherein:
$i_{PEAK}(n)$ is the peak current value for the $N^{th}$ cycle of the control switch 510 during the $HLC_{PERIOD}$, and n is an integer index.
n is an integer representing a current number cycles of the current control switch during the $HLC_{PERIOD}$,
$i_{IN\_TARGET}$ is a target input current to the switching power converter,
TT is a period of the cycle of the current control switch, and
T1 is a conduction time of the current control switch during the cycle.

In operation 610, if $Q_{UNPUSHED}<Q_{PUSHED}(n) \cdot k$, then to operate the switching power converter in an error reduction mode, in operation 614 the controller 522 is further configured to determine $i_{PEAK}(M+y)$ for each (M+y) cycle as a function of at least $Q_{UNPUSHED}$, $Q_{PUSHED}(M)$, $i_{PEAK}(M)$, and T2, and y is an integer index. In at least one embodiment, $i_{PEAK}(M+y)$ as a function of $Q_{UNPUSHED}$, $Q_{PUSHED}(M)$, $i_{PEAK}(M)$, and T2 is in accordance with Equation 7 and Equation 8:

$$i_{PEAK}(M+y) = i_{PEAK}(M) \cdot \sqrt{r}, \quad \text{Equation 7}$$

$$r = \frac{Q_{UNPUSHED}}{Q_{PUSHED}(M)} \quad \text{Equation 8}$$

The particular implementation of the controller 502 is a matter of design choice. In at least one embodiment, the controller 502 is implemented as an integrated circuit that includes hardware components that are configured to implement the functionality of the controller 502 including the multi-mode with charge error reduction current controller 522. In at least one embodiment, the controller 302 includes a memory (not shown) that includes code, such as code to implement the normal mode and error reduction mode process 600, that is executable by and, thus, programs a processor (not shown) of the controller 502 to implement the functionality of the controller 502. At the end of each half line cycle of the supply voltage $V_{SUPPLY}$, the process 600 repeats.

Figure 7:
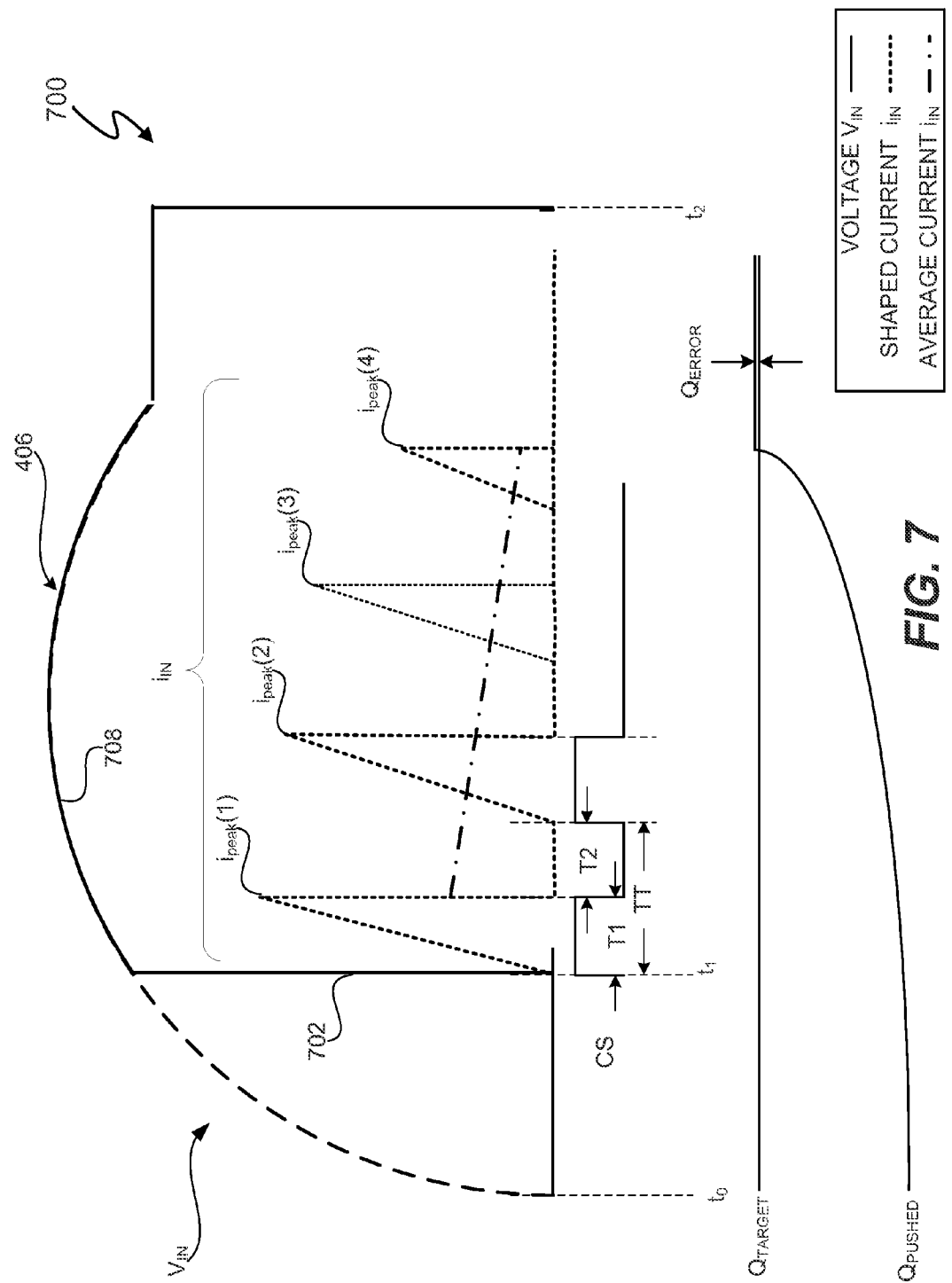
FIG. 7 depicts exemplary operational waveforms for an embodiment of the electronic systems of FIGS. 2 and 5.

FIG. 7 depicts exemplary operational waveforms 700 for an embodiment of the electronic systems 200 and 500. The exemplary input voltage $V_{IN}$ is phase-cut between time $t_0$ and $t_1$. At time $t_1$ at the leading edge 702 of the input voltage $V_{IN}$, controller 521 begins to generate the control signal CS. The controller 522 determines the peak current value $i_{PEAK}(n)$ for the input current $i_{IN}$ using the normal mode for n={1,3}. After the third cycle of the control signal CS, the controller 522 determines that the unpushed charge $Q_{UNPUSHED}$ to the load 216 is less than the charge $Q_{PUSHED}$ to the load 216 during the third cycle of the control signal CS. Thus, M in the foregoing equations equals 3. To determine the next peak current $i_{PEAK}$ (M+1), i.e. $i_{PEAK}(4)$, the controller 522 enters the error reduction mode and determines the peak current $i_{PEAK}(4)$. The resultant charge error $Q_{ERROR}$ is reduced relative to the charge error that would occur if the controller 502 did not enter the error reduction mode.

Figure 8:
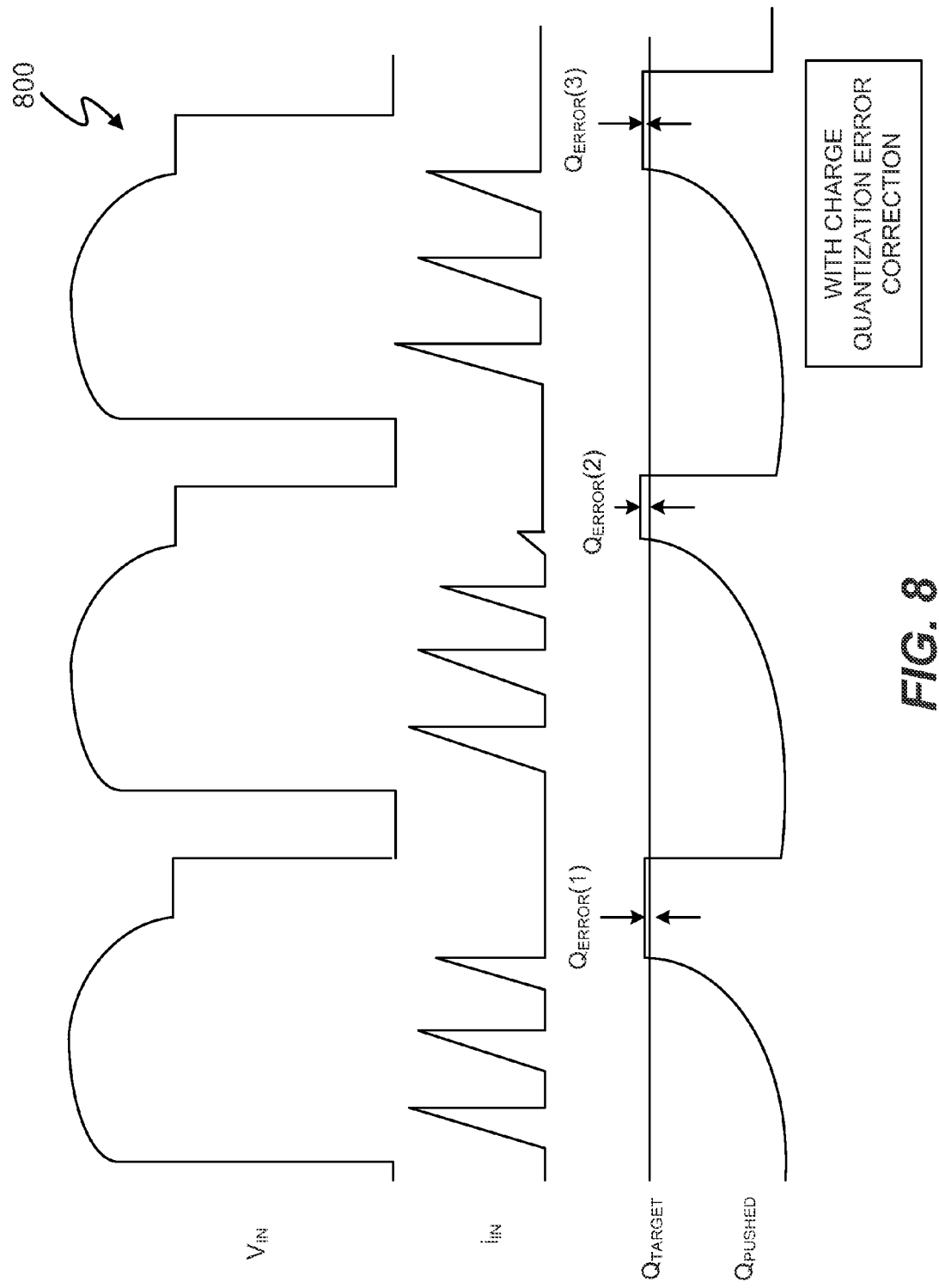
FIG. 8 depicts exemplary signal and charge integration waveforms that include charge error reduction.

FIG. 8 depicts exemplary signal and charge integration waveforms 800 that include charge error reduction by utilizing the error reduction modes of controllers 218 and 522. The operating parameters are the same as used to generate the waveforms 300 (FIG. 3), but the quantization charge errors $Q_{ERROR}(1)$, $Q_{ERROR}(2)$, and $Q_{ERROR}(3)$ are reduced.

Figure 9:
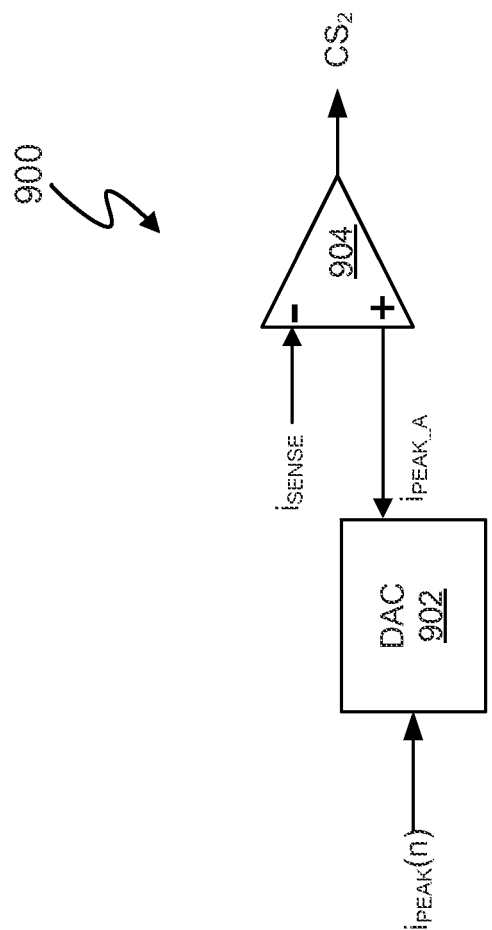
FIG. 9 depicts an embodiment of a switching power converter of the electronic system of FIG. 5.

FIG. 9 depicts a switching power converter current controller 800, which represents one embodiment of the switching power converter current controller 521. As previously described, the controller 522 determines the peak current value $i_{PEAK}(n)$ of the input current and the digital-to-analog converter 902 converts the peak current $i_{PEAK}(n)$ value to an analog peak current signal $i_{PEAK\_A}$ that is scaled to correspond to the same scale as sense current signal $i_{SENSE}$. The comparator 904 drives the control signal CS to a logical 0 until the value of the sense current signal $i_{SENSE}$ exceeds the value of the analog sense current signal $i_{PEAK\_A}$. When the value of the sense current signal $i_{SENSE}$ exceeds the value of the analog sense current signal $i_{PEAK\_A}$, the comparator 904 drives the control signal CS to a logical 0.

Thus, an electronic system and method includes a controller to control a switching power converter in at least two different modes of operation, a normal mode and an error reduction mode. The controller controls an amount of charge pushed (i.e. delivered) by the switching power converter to a load to reduce a charge quantization error and, in at least one embodiment, reduce the charge quantization error to avoid power fluctuations.

Although embodiments have been described in detail, it should be understood that various changes, substitutions, and alterations can be made hereto without departing from the spirit and scope of the invention as defined by the appended claims.

What is claimed is:

1. A method comprising:
   operating the switching power converter in a first mode during multiple charge pushing cycles to push a first amount of charge to a load coupled to the switching power converter during a cycle of an input supply voltage to a switching power converter; and
   after one or more of the charge pushing cycles and when a remaining amount of charge to be pushed to the load relative to a target amount of charge to be pushed to the load is less than an amount of charge pushed to the load in an immediately preceding charge pushing cycle, operating the switching power converter in an error reduction mode to push a second amount of charge to the load that reduces an error in an amount of charge pushed to the load relative to the target amount that occurs if only the first mode is used to push charge to the load.

2. The method of claim 1 further comprising:
   modulating peak current values in the switching power converter during a cycle of the input supply voltage to the switching power converter to push an amount of charge to a load coupled to the switching power converter.

3. The method of claim 1 wherein determining if a remaining amount of charge to be pushed to the load relative to a target amount of charge to be pushed to the load is less than an amount of charge pushed to the load in an immediately preceding charge pushing cycle comprises determining if the remaining amount of charge to be pushed to the load relative to the target amount of charge to be pushed to the load is less than an amount of charge pushed to the load in an immediately preceding charge pushing cycle times a scaling factor.

4. The method of claim 3 wherein the scaling factor is a constant between 0 and 1.

5. The method of claim 1 further comprising:
   determining if a remaining amount of charge to be pushed to the load relative to a target amount of charge to be pushed to the load is less than an amount of charge pushed to the load in an immediately preceding charge pushing cycle.

6. The method of claim 1 wherein the load comprises one or more light emitting diodes.

7. The method of claim 1 wherein the switching power converter is a member of a group consisting of a flyback switching power converter, a buck switching power converter, a boost switching power converter, and a boost-buck switching power converter.

8. The method of claim 1 wherein each charge pushing cycle represents a cycle of a current control switch of the switching power converter and the switching power converter includes a transformer to transfer energy to the load, the method further comprising:
   determining a target charge to be pushed to the load in accordance with:

$$Q_{TARGET} = i_{OUT} \cdot \text{Dim} \cdot \text{HLC}_{PERIOD};$$

wherein:
   $Q_{TARGET}$ is the target charge to be pushed to the load,
   $i_{OUT}$ is a target current to be pushed to the load, Dim is a dim level indicated by a dimmer signal, and $HLC_{PERIOD}$ is a half line cycle of the input supply voltage provided to the switching power converter;

determining a total amount of charge pushed to the load during the $HLC_{PERIOD}$ in accordance with:

$$Q_{PUSHED} = \sum_{n=1}^{M} \left( \frac{N}{2} \cdot i_{PEAK}(n) \cdot T2 \right);$$

wherein:
$Q_{PUSHED}$ is the total amount of charge pushed,
M is an integer representing a total number cycles of the current control switch during the $HLC_{PERIOD}$ occurring during the normal mode of operation,
N is a number representing a turns ratio of primary-side to secondary-side windings of the transformer,
$i_{PEAK}(n)$ is a peak current in the primary-side winding for the $N^{th}$ cycle of the current control switch, and "n" is an integer index, and
T2 is a conduction time period of a current in the secondary-side winding;

determining a total amount of charge remaining to be pushed to the load after the $n^{th}$ cycle in accordance with:

$$Q_{UNPUSHED} = Q_{TARGET} - Q_{PUSHED};$$

wherein $Q_{UNPUSHED}$ is the total amount of charge remaining to be pushed to the load after the $n^{th}$ cycle;

determining an amount of charge pushed to the load in the $n^{th}$ cycle of the switch in accordance with:

$$Q_{PUSHED}(n) = \frac{N}{2} \cdot i_{PEAK}(n) \cdot T2;$$

wherein:
$Q_{PUSHED}(n)$ is the amount of charge pushed to the load in the $n^{th}$ cycle of the current control switch;
$i_{PEAK}(n)$ is the peak current value for the $n^{th}$ cycle of the current control switch;

determining if the total amount of charge remaining to be pushed to the load after the $n^{th}$ cycle is less than the amount of charge pushed to the load in the $n^{th}$ cycle of the switch times a scaling factor in accordance with:

$$Q_{UNPUSHED} < Q_{PUSHED}(n) \cdot k;$$

wherein k is a scaling factor between 0 and 1; and
if $Q_{UNPUSHED} \leq Q_{PUSHED}(n) \cdot k$, then operating the switching power converter in a first mode during multiple charge pushing cycles to push a first amount of charge to a load coupled to the switching power converter comprises:
determining a peak current value in accordance with:

$$i_{PEAK}(n) = 2 \cdot i_{IN\_TARGET} \cdot \frac{TT}{T1};$$

wherein:
$i_{PEAK}(n)$ is the peak current value for the $n^{th}$ cycle of the control switch during the $HLC_{PERIOD}$;
n is an integer representing a current number cycles of the current control switch during the $HLC_{PERIOD}$;
$i_{IN\_TARGET}$ is a target input current to the switching power converter;

TT is a period of the cycle of the current control switch,
T1 is a conduction time of the current control switch during the cycle; and if $Q_{UNPUSHED} < Q_{PUSHED}(n) \cdot k$, then operating the switching power converter in an error reduction mode comprises:
determining $i_{PEAK}(M+y)$ for each (M+y) cycle as a function of at least $Q_{UNPUSHED}$, $Q_{PUSHED}(M)$, $i_{PEAK}(M)$, and T2, and y is an integer index.

9. The method of claim 8 wherein $i_{PEAK}(M+y)$ as a the function of $Q_{UNPUSHED}$, $Q_{PUSHED}(M)$, $i_{PEAK}(n)$, and T2 comprises:

$$i_{PEAK}(M+y) = i_{PEAK}(n) \cdot \sqrt{k}, \text{ and}$$

$$k = \frac{Q_{UNPUSHED}}{Q_{PUSHED}(M)}.$$

10. An apparatus comprising:
a controller configured to:
operate a switching power converter in a first mode during multiple charge pushing cycles to push a first amount of charge to a load coupled to the switching power converter during a cycle of an input supply voltage to the switching power converter; and
after one or more of the charge pushing cycles and when a remaining amount of charge to be pushed to the load relative to a target amount of charge to be pushed to the load is less than an amount of charge pushed to the load in an immediately preceding charge pushing cycle, operate the switching power converter in an error reduction mode to push a second amount of charge to the load that reduces an error in an amount of charged pushed to the load relative to the target amount that occurs if only the first mode is used to push charge to the load.

11. The apparatus of claim 10 wherein the controller is further configured to modulate peak current values in a switching power converter during a cycle of an input supply voltage to the switching power converter to push an amount of charge to a load coupled to the switching power converter, wherein modulating the peak current values during the cycle of an input supply voltage.

12. The apparatus of claim 10 wherein to determine if a remaining amount of charge to be pushed to the load relative to a target amount of charge to be pushed to the load is less than an amount of charge pushed to the load in an immediately preceding charge pushing cycle, the controller is further configured to determine if the remaining amount of charge to be pushed to the load relative to the target amount of charge to be pushed to the load is less than an amount of charge pushed to the load in an immediately preceding charge pushing cycle times a scaling factor.

13. The apparatus of claim 12 wherein the scaling factor is a constant between 0 and 1.

14. The apparatus of claim 10 wherein the control is further configured to:
determine if a remaining amount of charge to be pushed to the load relative to a target amount of charge to be pushed to the load is less than an amount of charge pushed to the load in an immediately preceding charge pushing cycle.

15. The apparatus of claim 10 wherein the load comprises one or more light emitting diodes.

16. The apparatus of claim 10 wherein the switching power converter is a member of a group consisting of a flyback switching power converter, a buck switching power converter, a boost switching power converter, and a boost-buck switching power converter.

17. The apparatus of claim 10 wherein each charge pushing cycle represents a cycle of a current control switch of the switching power converter, the switching power converter includes a transformer to transfer energy to the load, and the controller is further configured to:
determine a target charge to be pushed to the load in accordance with:

$$Q_{TARGET} = i_{OUT} \cdot \text{Dim} \cdot HLC_{PERIOD};$$

wherein:
$Q_{TARGET}$ is the target charge to be pushed to the load,
$i_{OUT}$ is a target current to be pushed to the load,
Dim is a dim level indicated by a dimmer signal, and
$HLC_{PERIOD}$ is a half line cycle of the input supply voltage provided to the switching power converter;
determine a total amount of charge pushed to the load during the $HLC_{PERIOD}$ in accordance with:

$$Q_{PUSHED} = \sum_{n=1}^{M} \left( \frac{N}{2} \cdot i_{PEAK}(n) \cdot T2 \right);$$

wherein:
$Q_{PUSHED}$ is the total amount of charge pushed,
M is an integer representing a total number cycles of the current control switch during the $HLC_{PERIOD}$ occurring during the normal mode of operation,
N is a number representing a turns ratio of primary-side to secondary-side windings of the transformer,
$i_{PEAK}(n)$ is a peak current in the primary-side winding for the $N^{th}$ cycle of the current control switch, and "n" is an integer index, and
T2 is a conduction time period of a current in the secondary-side winding;
determine a total amount of charge remaining to be pushed to the load after the $n^{th}$ cycle in accordance with:

$$Q_{UNPUSHED} = Q_{TARGET} - Q_{PUSHED};$$

wherein $Q_{UNPUSHED}$ is the total amount of charge remaining to be pushed to the load after the $n^{th}$ cycle;
determine an amount of charge pushed to the load in the $n^{th}$ cycle of the switch in accordance with:

$$Q_{PUSHED}(n) = \frac{N}{2} \cdot i_{PEAK}(n) \cdot T2;$$

wherein:
$Q_{PUSHED}(n)$ is the amount of charge pushed to the load in the $n^{th}$ cycle of the current control switch;
$i_{PEAK}(n)$ is the peak current value for the $n^{th}$ cycle of the current control switch;
determine if the total amount of charge remaining to be pushed to the load after the $n^{th}$ cycle is less than the amount of charge pushed to the load in the $n^{th}$ cycle of the switch times a scaling factor in accordance with:

$$Q_{UNPUSHED} < Q_{PUSHED}(n) \cdot k;$$

wherein k is a scaling factor between 0 and 1; and
if $Q_{UNPUSHED} \leq Q_{PUSHED}(n) \cdot k$, then to operate the switching power converter in a first mode during multiple charge pushing cycles to push a first amount of charge to a load coupled to the switching power converter, the controller is further configured:
determine a peak current value in accordance with:

$$i_{PEAK}(n) = 2 \cdot i_{IN\_TARGET} \cdot \frac{TT}{T1};$$

wherein:
$i_{PEAK}(n)$ is the peak current value for the first to $n^{th}$ number of cycles of the control switch during the $HLC_{PERIOD}$, and n is an integer index;
n is an integer representing a current number cycles of the current control switch during the $HLC_{PERIOD}$,
$i_{IN\_TARGET}$ is a target input current to the switching power converter,
TT is a period of the cycle of the current control switch, and
T1 is a conduction time of the current control switch during the cycle; and
if $Q_{UNPUSHED} < Q_{PUSHED}(n) \cdot k$, then to operate the switching power converter in an error reduction mode, the controller is further configured:
determine $i_{PEAK}(M+y)$ for each (M+y) cycle as a function of at least $Q_{UNPUSHED}$, $Q_{PUSHED}(M)$, $i_{PEAK}(M)$, and T2, and y is an integer index.

18. The apparatus of claim 17 wherein $i_{PEAK}(M+y)$ as a the function of $Q_{UNPUSHED}$, $Q_{PUSHED}(M)$, $i_{PEAK}(M)$, and T2 comprises:

$$i_{PEAK}(M + y) = i_{PEAK}(M) \cdot \sqrt{k}, \text{ and}$$

$$k = \frac{Q_{UNPUSHED}}{Q_{PUSHED}(M)}.$$

19. An apparatus comprising:
a switching power converter;
a load, coupled to the switching power converter;
a controller, coupled to the switching power converter, wherein the controller is configured to:
operate the switching power converter in a first mode during multiple charge pushing cycles to push a first amount of charge to the load coupled to the switching power converter during a cycle of an input supply voltage to the switching power converter; and
after one or more of the charge pushing cycles and when a remaining amount of charge to be pushed to the load relative to a target amount of charge to be pushed to the load is less than an amount of charge pushed to the load in an immediately preceding charge pushing cycle, operate the switching power converter in an error reduction mode to push a second amount of charge to the load that reduces an error in an amount of charge pushed to the load relative to the target amount that occurs if only the first mode is used to push charge to the load.

20. The apparatus of claim 19 wherein the load comprises one or more light emitting diodes.

* * * * *